United States Patent [19]
Betts et al.

[11] Patent Number: 4,649,702
[45] Date of Patent: Mar. 17, 1987

[54] INJECTABLE FLUID FLASH SUPPRESSOR

[75] Inventors: Robert E. Betts; William S. Melvin, both of Huntsville; Lawrence B. Thorn, Madison, all of Ala.

[73] Assignee: The United States of America as represented by the Secretary of the Army, Washington, D.C.

[21] Appl. No.: 765,098

[22] Filed: Aug. 13, 1985

[51] Int. Cl.⁴ .......................... F02K 9/00; F02K 9/72
[52] U.S. Cl. ........................................ 60/253; 60/254
[58] Field of Search ................ 60/251, 253, 254, 250, 60/255, 256, 258, 259; 102/374, 704

[56] References Cited

U.S. PATENT DOCUMENTS

| | | |
|---|---|---|
| 3,105,350 | 10/1963 | Eichenberger ...................... 60/254 |
| 3,133,413 | 5/1964 | Lawrence ............................. 60/253 |
| 3,195,302 | 7/1965 | Hughes et al. ....................... 60/253 |
| 3,228,188 | 1/1966 | Sargent et al. ...................... 60/254 |
| 3,296,801 | 1/1967 | Williams et al. .................... 60/253 |
| 3,304,722 | 2/1967 | Culpepper ........................... 60/253 |
| 3,340,691 | 9/1967 | Mangum .............................. 60/250 |
| 3,427,809 | 2/1969 | Lavoie .................................. 60/253 |
| 3,491,539 | 1/1970 | Mangum .............................. 60/253 |

*Primary Examiner*—Louis J. Casaregola
*Assistant Examiner*—Timothy S. Thorpe
*Attorney, Agent, or Firm*—John C. Garvin, Jr.; James T. Deaton

[57] ABSTRACT

A rocket motor that has a fast burning propellant therein with a dispenser arrangement for dispensing a fluid chemical suppressant into the exhaust gases of the solid propellant for reducing the flash signature.

18 Claims, 2 Drawing Figures

INJECTABLE FLUID FLASH SUPPRESSOR

DEDICATORY CLAUSE

The invention described herein may be manufactured, used, and licensed by or for the Government for governmental purposes without the payment to us of any royalties thereon.

BACKGROUND OF THE INVENTION

Current minimum smoke rocket motor solid propellants produce fuel rich exhaust products that combust or afterburn with air beyond the nozzle exit of the rocket motor. Such afterburning does not contribute to rocket motor thrust, is undesirable, and in many cases is unacceptable because it increases the radiation emission signature of the missile.

There are many documented approaches for the use of chemical means to suppress afterburning, however they have not been proven to be acceptable for accomplishing the desired results in afterburning. Depending upon the nature of the chemicals used, various previous methods have included: (1) the incorporation of the chemical suppressant into the main rocket motor propellant itself, (2) coating resonance rods with the chemical suppressants and placing them inside the rocket motor structure and (3) using ablative nozzle rings or sections in the rocket motor for providing suppressant for the rocket motor.

Many solid propellants that are used in these minimum smoke type solid propellants are chemically or otherwise incompatible with the suppressant so that direct incorporation into the minimum smoke solid propellant is not possible. In these prior devices, the ablative technique is ineffective and requires large amounts of suppressant that results in smoke signature. Therefore, it can be seen that a device or technique that is effective in eliminating or effectively controlling afterburning in a rocket motor is badly needed.

Accordingly, it is an object of this invention to provide a new device and technique for introducing a fluid chemical flash suppressant into the exhaust gases of a rocket motor so as to cause a chemical reaction between the chemical fluid and the exhaust gases to reduce the flash signature.

Another object of this invention is to provide an arrangement which utilizes an igniter for igniting both a solid propellant and a dispenser grain for dispensing a fluid chemical flash suppressant.

Still another object of this invention is to provide a device which utilizes a technique of injecting fluid chemical material into rocket motor exhaust gases by means of a dispenser grain which produces gas and causes the fluid chemical material to be ejected and into the exhaust gases as the dispenser grain burns.

A still further object of this invention is to provide an arrangement which can utilize a fluid chemical flash suppressant that can be dispensed over a temperature range of about −60° F. to about 180° F.

Other objects and advantages of this invention will be obvious to those skilled in this art.

SUMMARY OF THE INVENTION

In accordance with this invention, a device is provided for dispensing a fluid or jel into the gaseous products of a rocket motor so as to cause a chemical reaction between the fluid or jel and the rocket motor gases to reduce the flash signature of the rocket motor. A specific chemical for application in the device of this invention includes anhydrous ammonia in liquid form that has operating and storage capability from about −60° F. to about 180° F.

DETAILED DESCRIPTION OF THE PREFERRED EMBODIMENT

Figure 1:
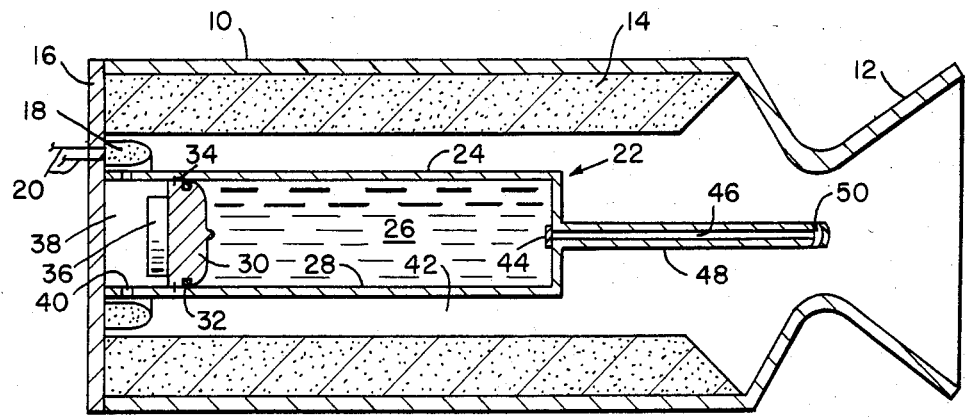
FIG. 1 is a sectional view of a rocket motor with a dispensing device in accordance with this invention.
Figure 2:
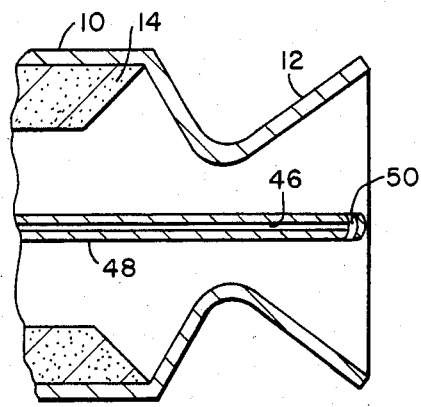
FIG. 2 is a sectional view partially cutaway and illustrating the dispenser spray head of the dispensing device in a different position relative to the rocket motor nozzle.

In accordance with this invention, a rocket motor case 10 is illustrated that has an exhaust nozzle 12 with a minimum smoke solid propellant main motor charge 14 mounted in the chamber defined within motor case 10. At forward end 16 of rocket motor case 10 an igniter arrangement 18 is provided and of conventional structure for igniting solid propellant 14 when initiated through leads 20. A dispenser 22, which includes a means for storing a fluid chemical suppressant, is mounted in the chamber of rocket motor housing 10 by being secured in a conventional manner to end wall 16. Dispenser 22 has housing structure 24 that defines with end wall 16 a chamber 26. The inner surface of housing 24 has a cylindrical surface 28 with a piston 30 slidably mounted relative to cylindrical surface 28. Piston 30 is provided with a conventional seal 32 for sealing between piston 30 and cylindrical surface 28, and a shear pin arrangement 34 is provided for securing piston 30 in position until it is desired to move piston 30. A dispenser charge 36 is mounted in a conventional manner on one side of piston 30 and is enclosed by piston 30, a portion of housing 24, and a portion of end wall 16 which together define chamber 38. Dispenser throat passages 40 are provided in housing 24 for communication between rocket motor chamber 42 and dispenser chamber 38. Chamber 26 of dispenser 22 contains a suppressant chemical such as a liquid or jel and in this application the particular liquid desirable is anhydrous ammonia ($NH_3$) that has an operating and storage temperature range of about −60° F. to about 180° F. This chemical works well in an arrangement as disclosed herein. A seal and burst disk 44 closes chamber 26 to passage 46 of tube 48. A dispenser spray head 50 is provided at one end of tube 48 for dispensing and spraying the liquid chemical suppressant into the rocket motor exhaust gases for reducing a flash signature. As illustrated in FIG. 1, dispenser spray head 50 opens in the region of the most constricted area of rocket motor nozzle 12. As illustrated in FIG. 2, dispenser head 50 can be positioned to dispense the chemical suppressant liquid beyond the most constricted portion of nozzle 12. If desired, dispenser spray head 50 could be positioned to dispense the suppressant liquid prior to the exhaust gases reaching nozzle 12. It is also pointed out that seal and burst disk 44 can be placed adjacent sprayhead 50 if desired. Also, depending upon the particular position of spray head 50, in some applications dispenser charge 36 can be omitted and the gases from chamber 42 can be utilized in chamber 38 for forcing piston 30 to expel the chemical suppressant from chamber 26.

In operation, when it is desired to initiate the rocket motor, igniter 18 is initiated through leads 20 to cause solid propellant 14 to be ignited and also to cause gases to be communicated through passages 40 to chamber 38 to cause dispenser charge 36 to be ignited. Also, pressure in chamber 38 causes shear pins 34 to be broken and burst disk 44 to be ruptured, and the gases produced by dispenser charge 36 acting in chamber 38 force piston 30 to move and expel the fluid chemical suppressant from chamber 26 and through spray head 50 to the gases exiting through nozzle 12. The fluid chemical suppressant and the gases from solid propellant 14 mix and the fluid chemical suppressant reduces the flash signature of the exhaust gases. Even though a dispenser charge 36 has been illustrated, in some applications the dispenser charge can be omitted and the pressure produced by the gases of solid propellant 14 can be utilized in chamber 38 to force piston 30 to expel the fluid chemical suppressant. The flow tube with head 50 has been illustrated as terminated at the throat of nozzle 12 and beyond the throat of nozzle 12, but if desired, tube 48 and spray head 50 could terminate inside chamber 42 of the rocket motor.

We claim:

1. A rocket motor comprising; a rocket motor case with a forward end and an aft end that has a rocket motor nozzle mounted thereat, a fast burning solid propellant mounted in said rocket motor case between said forward and said aft end, an igniter mounted at said forward end of said rocket motor case for igniting said solid propellant, and a dispenser in said rocket motor case and connected to said forward end of said rocket motor case and having a fluid chemical suppressant therein and means for sealing said fluid chemical suppressant in said dispenser and including means for dispensing said fluid chemical suppressant from said dispenser after said solid propellant has been ignited, said dispensing means comprising a tube with a spray head at one end and positioned adjacent said nozzle for dispensing the fluid chemical suppressant in the vicinity of said rocket motor nozzle such that said fluid chemical suppressant is mixed with the gases produced by said solid propellant to thereby reduce the flash signature of said gases as they exhaust from said motor nozzle.

2. A rocket motor as set forth in claim 1, wherein said dispenser further comprises a piston slidably and sealably mounted in said dispenser, a dispenser charge mounted on the side of said piston most remote from said suppressant and a chamber being defined by a portion of said dispenser, said piston and said forward end of said rocket motor case, and means for communicating the gases produced by ignition of said solid propellant with said dispenser charge.

3. A rocket motor as set forth in claim 2, wherein said dispenser has a fluid chemical chamber defined therein for storing said fluid chemical suppressant, said fluid chemical chamber being closed by a burst disk that seals said fluid chemical chamber from one side and said piston that seals said fluid chemical chamber from an opposite side, said piston having shear means for securing said piston in position until sufficient pressure acting on said piston breaks said shear means and said burst disk such that said fluid chemical suppressant is dispensed into said gases.

4. A rocket motor as set forth in claim 3, wherein said spray head is located at the throat portion of said rocket motor nozzle.

5. A rocket motor as set forth in claim 3, wherein said spray head is located for spraying the fluid chemical suppressant into a diverging portion of said rocket motor nozzle.

6. A rocket motor as set forth in claim 3, wherein said fluid chemical suppressant is anhydrous ammonia.

7. A rocket motor as set forth in claim 3, wherein said suppressant has an operation and storage temperature range of approximately $-60°$ to approximately $180°$ F.

8. A rocket motor comprising:
a rocket motor casing having a forward end and an aft end and including a nozzle mounted proximate said aft end, said nozzle having a diverging portion;
a fast burning solid propellant mounted in said casing between said forward end and said aft end;
means mounted in said casing for igniting said solid propellant;
means in said casing and connected to said forward end of said casing for storage of a suppressant and having a suppressant stored therein, and;
means connected to said storage means and terminating adjacent said nozzle for dispensing said suppressant from said storage means into the vicinity of said nozzle after said solid propellant is ignited such that said suppressant is mixed with the gases produced by said ignited propellant to thereby reduce the flash signature of said gases as they exhaust said nozzle.

9. The rocket motor of claim 8 wherein said storage means further comprises:
a cylindrical member having a piston internally secured proximate one end of said cylindrical member, said piston and said member defining two chambers, one of two chambers being defined by the surface of said piston most proximate said forward end of said casing and a portion of said cylindrical member having means for communicating with said gases produced by ignition of said propellant, said other of said two chambers being defined by a surface of said piston most remote from said forward end of said casing and the portion of said cylindrical member most proximate said aft end of said casing.

10. The rocket motor of claim 9 wherein said dispensing means further comprises:
a tube having a spray head operatively connected to said cylindrical member for dispensing said suppressant into the vicinity of said nozzle such that said flash signature is reduced.

11. The rocket motor of claim 10 wherein said storage means further comprises:
rupture means for releasably sealing said suppressant in said storage means.

12. The rocket motor of claim 11 wherein said sealing means further comprises:
sealing means mounted on said piston and said rupture means includes a burst disk positioned at an entrance to said tube.

13. The rocket motor of claim 12 wherein said dispensing means further comprises:
means for securing said piston in position in said cylindrical member prior to said propellant being ignited.

14. The rocket motor of claim 13 wherein said securing means further comprises:
shear means which break upon generation of sufficient pressure exerted thereon.

15. The rocket motor of claim 10 wherein said spray head is positioned in the throat of said nozzle.

16. The rocket motor of claim 10 wherein said spray head is positioned beyond said throat but still within said diverging portion of said nozzle.

17. The rocket motor of claim 14 wherein said suppressant has an operational and storage temperature of approximately −60° F. to approximately 180° F.

18. A rocket motor comprising:

a casing having a forward end and an aft end and including a nozzle mounted proximate said aft end;

a fast burning solid propellant mounted in said casing between said forward end and said nozzle;

an ignitor positioned in said casing for igniting said solid propellant;

a hollow member in said casing and connected to said forward end of said casing, having throat passage means in at least one end thereof, and storing a fluid chemical suppressant therein, said chemical suppressant having an operational and storage temperature of approximately −60° F. to approximately 180° F.;

a piston securely positioned in said hollow member by shear means, said piston being slidably and sealably operative within said hollow member when said shear means are broken upon generation of sufficient pressure exerted thereon, said piston, a portion of said hollow member and said forward end of said casing defining a chamber, said chamber being in communication with said casing through said throat passage means;

a tube connected at one end to the end of said hollow member most remote from said forward end of said casing and having a spray head connected at the other end and adjacent said nozzle for dispensing said suppressant in the vicinity of said nozzle; and a burst disk for sealing said suppressant in said hollow member between said spray head and said piston such that when said shear means and said burst disk are broken said suppressant is mixed with gases produced from said ignited solid propellant to thereby reduce the flash signature of said rocket motor.

* * * * *